United States Patent [19]

Masuda et al.

[11] Patent Number: 4,488,475
[45] Date of Patent: Dec. 18, 1984

[54] POWER STEERING APPARATUS

[75] Inventors: Naosuke Masuda; Yoshio Suzuki; Tadaaki Fujii, all of Higashimatsuyama, Japan

[73] Assignee: Jidosha Kiki Co., Ltd., Tokyo, Japan

[21] Appl. No.: 469,376

[22] Filed: Feb. 24, 1983

[30] Foreign Application Priority Data

Mar. 15, 1982 [JP] Japan .................................. 57-40456

[51] Int. Cl.³ .............................................. F15B 9/10
[52] U.S. Cl. .................... 91/462; 91/375 R; 137/625.21
[58] Field of Search ............... 91/375 R, 375 A, 467, 91/470, 462; 267/158, 164, 182; 180/132; 137/625.21

[56] References Cited

U.S. PATENT DOCUMENTS

| | | | |
|---|---|---|---|
| 2,263,113 | 11/1941 | Wichorek et al. | 64/27 |
| 2,484,321 | 10/1949 | Stubau | 64/27 |
| 2,917,079 | 12/1959 | Verbrugge et al. | 91/375 R |
| 2,983,283 | 5/1961 | Sattavara | 137/622 |
| 3,131,602 | 5/1964 | Ford | 91/375 R |
| 3,145,626 | 8/1964 | Vickers et al. | 91/375 A |
| 3,162,263 | 12/1964 | Brown, Jr. | 91/375 A |
| 3,227,178 | 1/1966 | Elwell | 137/625.21 |
| 3,273,465 | 9/1966 | Eddy | 91/375 A |
| 3,722,368 | 3/1973 | Suzuki | 91/375 R |
| 4,057,079 | 11/1977 | Taig | 91/375 R |
| 4,117,864 | 10/1978 | Taig | 91/375 R |
| 4,214,642 | 7/1980 | Dauvergne | 91/375 A |
| 4,428,399 | 1/1984 | Masuda et al. | 91/375 A |

FOREIGN PATENT DOCUMENTS 55-42698 3/1980 Japan .
4318330 7/1980 Japan .

Primary Examiner—Paul E. Maslousky
Attorney, Agent, or Firm—Flynn, Thiel, Boutell & Tanis

[57] ABSTRACT

A power steering apparatus includes a control valve of disc type which controls the delivery to or displacement from a power cylinder of a hydraulic fluid. A pair of mating parts are formed on the input and the output side for integral rotation therewith. A substantially C-shaped spring is engageable with the mating parts, which are maintained in position by the resilience of the spring.

9 Claims, 6 Drawing Figures

POWER STEERING APPARATUS

BACKGROUND OF THE INVENTION

The invention relates to a power steering apparatus, and in particular, to such apparatus in which a control valve which controls the delivery to or displacement from a power cylinder of hydraulic fluid is of a disc type.

Generally, a control valve of disc type comprises a first valve element which is integrally mounted on the input shaft which is associated with a steering wheel, and a second valve element which is integrally mounted on the output shaft which is associated with steerable road wheels and disposed across and in surrounding relationship with the first valve element. In operation, on angular displacement occurs between the input and the output shaft or between the first and the second valve element from their neutral relative position, controlling the delivery to or displacement from a power cylinder of hydraulic fluid. A reaction spring in the form of a torsion bar, a leaf spring, a coiled spring or the like is interposed between the both valve elements in order to enable them to be maintained in their neutral position whenever the valve is not operated.

However, the use of a torsion bar results in an increase in the axial length of the power steering apparatus and in the diameter of a portion thereof which contains the control valve, and also suffers from the inability that it cannot be preloaded. A construction which incorporates a coiled spring in order to enable a preloading results in a complex arrangement. The use of a leaf spring or coiled spring suffers from a disadvantage that a high spring rate cannot be obtained for its size. A proposal has been made to add to the resilience of the spring by producing a reaction oil pressure within the control valve. However, the use of the reaction oil pressure within the control valve of disc type results in a complex construction and also requires additional seals, giving rise to the likelihood that the performance of the control valve may be degraded.

SUMMARY OF THE INVENTION

Therefore, it is an object of the invention to provide a power steering apparatus which is compact and has a simple construction.

It is another object of the invention to provide a power steering apparatus which enables a preloading between the input and the output shaft to produce a reasonable steering sensation. Such object is accomplished by providing a pair of mating parts disposed on the input and the output side and which are adapted to move angularly in an integral manner with the latter and which can be maintained in a given position by the resilience of a substantially C-shaped spring which is engageable with the mating parts.

Other objects and advantages of the invention will become apparent from the following description given with reference to the attached drawings.

DESCRIPTION OF EMBODIMENTS

Figure 1:
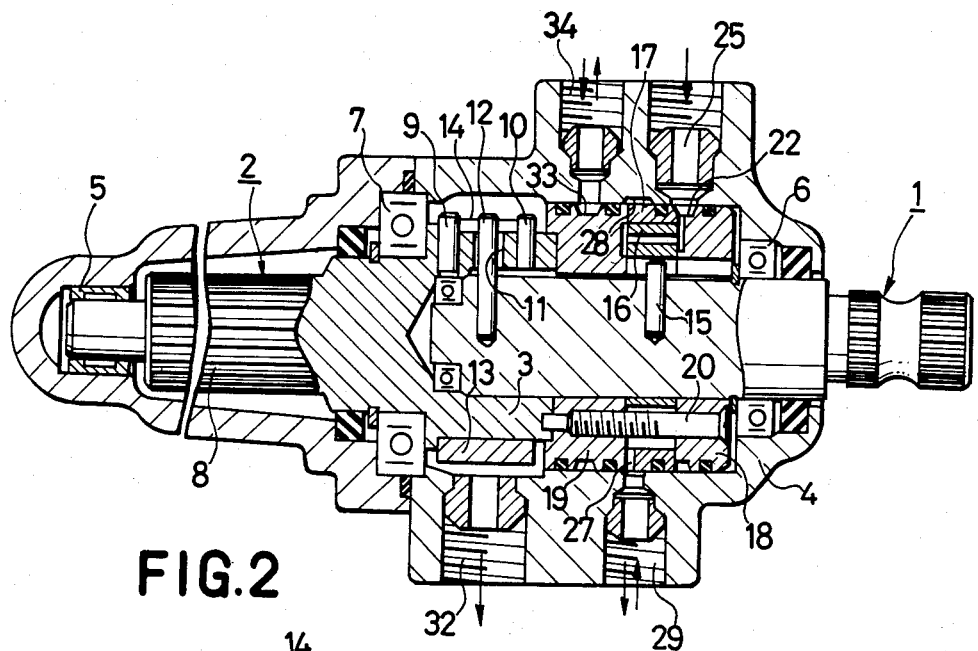
FIG. 1 is a side elevation, partly in longitudinal section, of a first embodiment of the invention.

Referring to FIG. 1, there are shown an input shaft 1 and an output shaft 2 which are disposed in axial alignment with each other. The free end of the input shaft 1 is fitted into a cylindrical portion 3 which is formed in the adjacent end of the output shaft 2. The both shafts 1 and 2 are rotatably disposed within a housing 4 by means of bearings 5, 6, 7 as they are fitted each other. The input shaft 1 is connected to a steering wheel, not shown, while the output shaft 2 is formed with a helical pinion 8, which meshes with a rack which is in turn mechanically coupled to steerable road wheels, not shown.

Portions of the input and the output shaft 1, 2 which are in fitting engagement with each other, that is, those portions located within the cylindrical portion 3, mesh with each other to permit a relative rotation therebetween through a given angle, providing a so-called fail-safe mechanism. A pair of projections 9, 10 extend radially outward from the cylindrical portion 3, and a radially extending opening 11 is formed in the cylindrical portion 3 intermediate the projections 9, 10. A projection 12 fixedly mounted on the input shaft 1 extends through the opening 11 to the outside of the cylindrical portion 3. A spring 13 which is substantially C-shaped in section is disposed in surrounding relationship with the cylindrical portion 3, with the projections 9, 10 and 12 being held between the opposite end faces which define a notch 14 in the C-shaped spring 13. The opening 11 has a diameter which is slightly greater than the diameter of the projection 12, allowing a relative rotation between the input and the output shaft 1, 2 while the projections 9, 10 and 12 formed thereon cause a flexure of the C-shaped spring 13.

In its unstressed condition, the notch 14 formed in the C-shaped spring 13 has a gap length in the circumferential direction which is chosen to be slightly less than the diameter of the projections 9, 10 and 12. Accordingly, by causing the C-shaped spring 13 to hold the projections 9, 10 and 12 between the end faces of the notch, a desired preloading across the input and the output shaft 1, 2 can be achieved. When no external force is applied across the input and the output shaft 1, 2, the C-shaped spring 13 maintains them in their neutral position, whereby a hydraulic oil supplied from an oil pump is returned to a tank without being delivered to a power cylinder.

Figure 2:
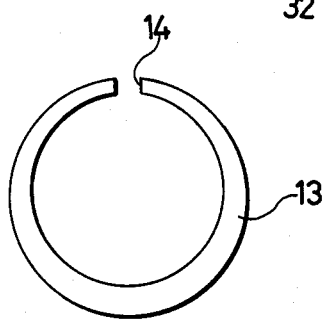
FIG. 2 is a front view of a C-shaped spring.

As shown in FIG. 2, the C-shaped spring 13 has a thickness which increases gradually from the region of the notch 14 to a point which is diametrically opposite to the notch 14 so that stresses produced be substantially uniform throughout the spring when it is flexed.

A control valve of disc type is disposed around the periphery of the input shaft 1 for controlling the delivery to or displacement from a power cylinder of a hydraulic fluid in accordance with the relative angular displacement between the input and the output shaft 1, 2. Specifically, the C-shaped spring 13 as well as the projections 9, 10 and 12 are located further away from the input shaft 1 with respect to the control valve. The control valve comprises an inner valve member 16 secured to the input shaft 1 by means of a pin 15, an outer valve member 17 disposed in surrounding relationship with the inner valve member 16 and a first and a second side valve member 18, 19 which are disposed on the opposite sides of the inner and the outer valve member 16, 17. The side valve members 18, 19 are integrally coupled together by pins 20 which extend through interconnecting holes 36, 37 (see FIG. 3), and are secured to the end of the output shaft 2. In addition, the second side valve member 19 and the outer valve member 17 are integrally coupled together by a pin 21 shown in FIG. 3. In this manner, a first control valve element comprising the inner valve member 16 rotates in an integral manner with the input shaft 1 while a second control valve element comprising the outer valve member 17, and the first and the second side valve member 18, 19 rotates with the output shaft 2, whereby a relative angular displacement between the both valve elements controls the delivery to or displacement from a power cylinder of a hydraulic fluid.

Figure 4:
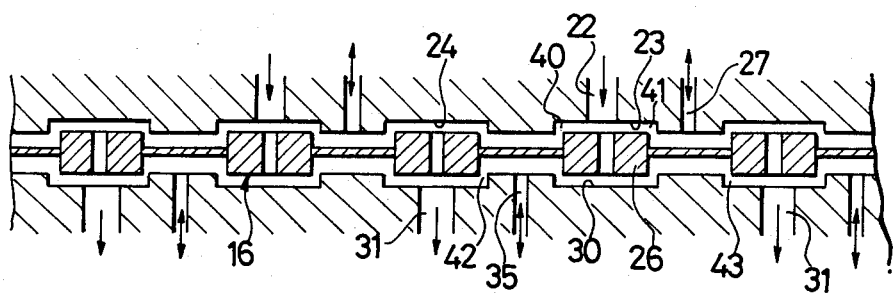
FIG. 4 is a developed view of an inner valve member and its connected paths.
Figure 3:
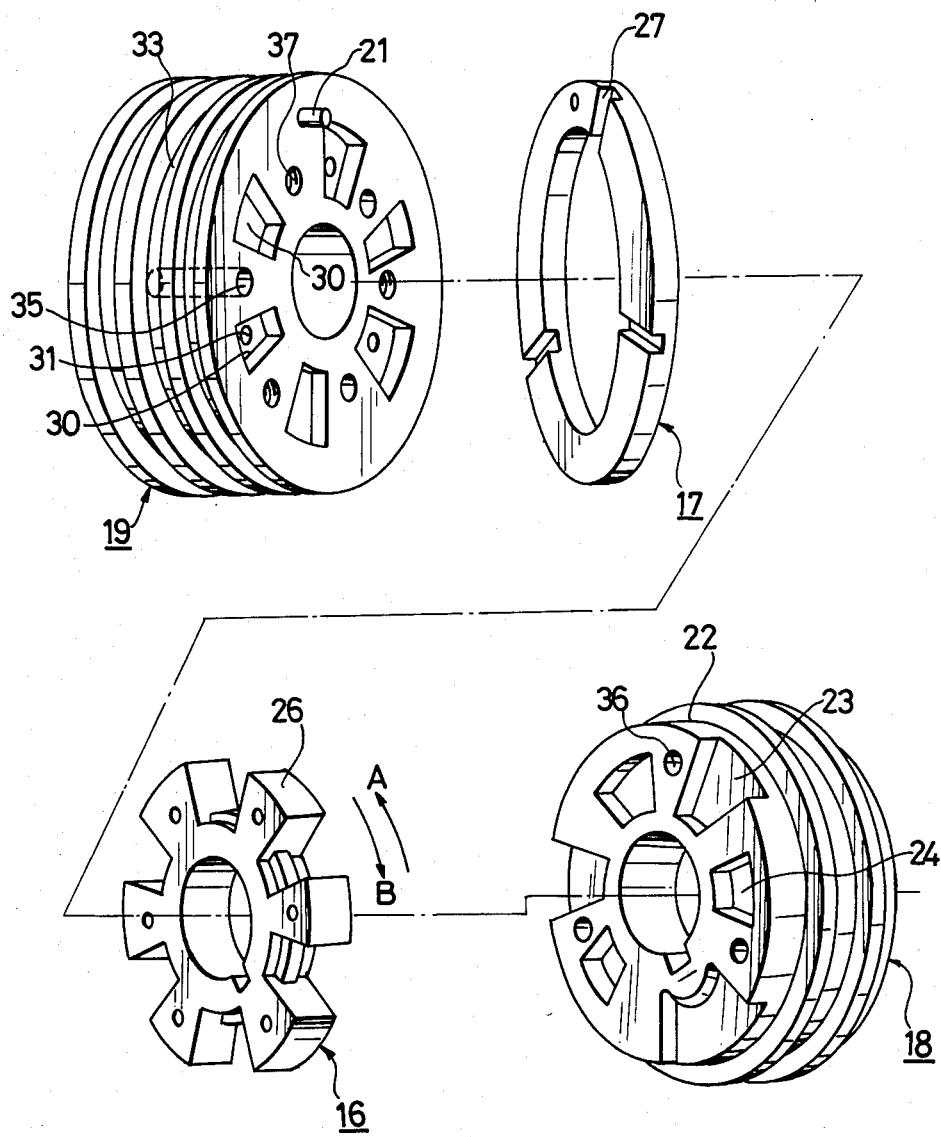
FIG. 3 is an exploded, perspective view of a control valve of disc type.

FIG. 3 is an exploded view of the control valve. As shown, a groove 22 is formed around the outer periphery of the first side valve member 18. Formed in one end face of the valve member 18 are three inlet chambers 23 which communicate with the groove 22, and three recesses 24 which can located intermediate adjacent inlet chambers 23. The groove 22 is disposed in axial alignment with an inlet port 25 formed in the housing 4 so as to be maintained in communication with a pump, not shown, through the port 25. The inner valve member 16 is formed with six radial extensions 26 which are arranged to overlap the inlet chambers 23 and the recesses 24. FIG. 4 is a developed view of the inner valve member 16 and various paths connected thereto. As shown, the radial extensions 26 has a circumferential width which is chosen to be slightly less than the width of the inlet chambers 23 and the recesses 24, whereby clearances such as shown at 40, 41, 42 and 43 which are defined between the edges of the radial extensions 26 and the edges of the chambers 23 and the recesses 24 define flow paths for hydraulic fluid.

The outer valve member 17 which is fitted around the periphery of the inner valve member 16 is formed with passages 27, in the form of notches, for introducing the hydraulic fluid which has passed through the clearance 41 into the left-hand pressure chamber, not shown, of a power cylinder. Specifically, the passages 27 is normally disposed in alignment with a circumferential groove 28 formed in the inner surface of the housing 4, and thus communicate with the left-hand pressure chamber of the power cylinder through a first output port 29 which is formed in the housing 4. Accordingly, the passages 27 may communicate with the clearance 41 and the groove 22 to supply the hydraulic fluid from the pump to the left-hand pressure chamber, or alternatively may communicate with the clearance 43 and a path 31, to be described later, to return an excess amount of fluid to the tank from the left-hand pressure chamber.

One end face of the second side valve member 19 is formed with six recesses 30 which are located opposite to the radial extensions 26. Alternate recesses 30 are formed with paths 31 which are connected to a tank, not shown. Specifically, the paths 31 communicate with an outlet port 32 formed in the housing for returning the hydraulic fluid to the tank through the port 32. A groove 23 is formed in the outer periphery of the second side valve member 19 and is positioned to be maintained in axial alignment with a second output port 34 so as to communicate with the right-hand pressure chamber of the power cylinder. Thus, the groove 33 may communicate with the pump through a path 35 formed between adjacent recesses 30 and the clearance 40 to supply the hydraulic fluid to the right-hand pressure chamber or alternatively may communicate with the tank through the clearance 42 and the path 31 to return the hydraulic fluid to the tank from the right-hand pressure chamber.

In operation, when the steering wheel assumes its neutral position, the inner valve member 16 assumes the position shown in FIG. 4, opening all of the clearances 40 to 43. Thus, the hydraulic fluid supplied from the pump is returned to the tank through the path 31 and the outlet port 32. No substantial fluid is supplied to either pressure chamber of the power cylinder, which is therefore maintained inoperative. If the steering wheel is then turned to the right, the input shaft 1 moves angularly while causing the projections 9, 10 and 12 to flex the C-shaped spring 13. The inner valve member 16 also rotates in the direction of an arrow A shown in FIGS. 3 and 4, thus closing the clearances 41 and 42. As a consequence, the hydraulic fluid supplied from the pump is delivered to the right-hand pressure chamber of the power cylinder through the inlet port 25, groove 22, inlet chamber 23, clearance 40, path 35, groove 33, and second output port 34, assisting in steering the steering wheel to the right. An excess amount of fluid is returned to the tank from the left-hand chamber of the power cylinder through the first outlet port 29, groove 28, passage 27, clearance 43 and path 31. Conversely, if the steering wheel is turned to the left, the inner valve member 16 rotates in the direction of an arrow B, closing the clearances 40 and 43. As a consequence, the hydraulic fluid supplied from the pump is delivered to the left-hand pressure chamber of the power cylinder through the inlet port 25, groove 22, inlet chamber 23, clearance 41, passage 27, groove 28 and the first outlet port 29, thus assisting in steering the steering wheel to the left. An excess amount of fluid is returned to the tank from the right-hand pressure chamber through the second outlet port 34, groove 33, path 35, clearance 42 and path 31.

In the embodiment described above, the projections 9, 10 and 12 are separate from control valve elements and are secured to the input and the output shaft 1, 2. Accordingly, in the operation of the control valve as mentioned above, the resilience of the C-shaped spring 13 which is produced as a result of the relative angular displacement between the input and the output shaft 1, 2 has no influence upon the valve elements 16, 17, 18 and 19, and this assures a smooth operation of the control valve and adds to the durability thereof.

The provision of the pair of projections 9, 10 on the output shaft 2 allow them to abut against one end face of the notch 14 of the spring 13 at points which are adjacent to the box axial edges thereof, assuring a flexure of the spring without accompanying any twisting thereof and allowing a smooth returning motion to its inoperative position. This assures a hysteresis-free response.

In addition, the use of the C-shaped spring 13 allows an increased spring rate to be readily obtained, eliminating the need to produce a reaction oil pressure within the control valve, the construction of which is therefore simplified.

Figure 5:
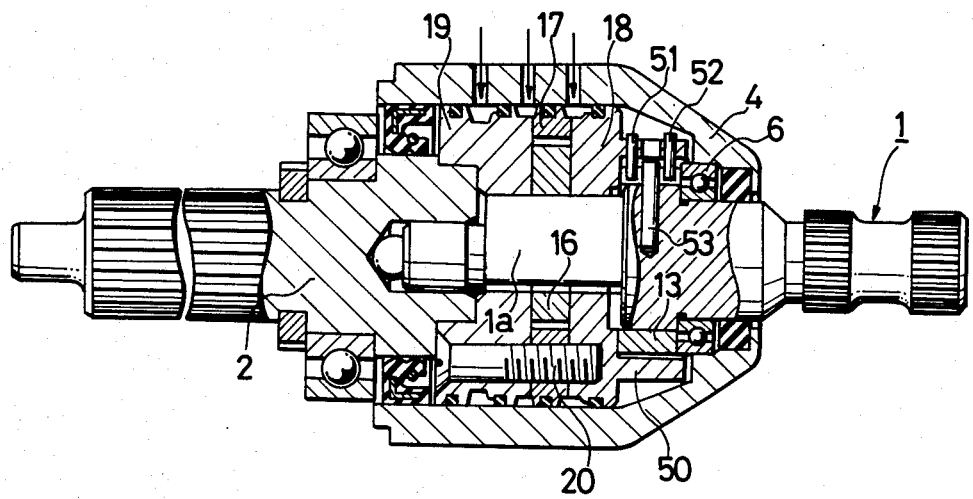
FIG. 5 is a similar view to FIG. 1, but illustrating a second embodiment of the invention.
Figure 6:
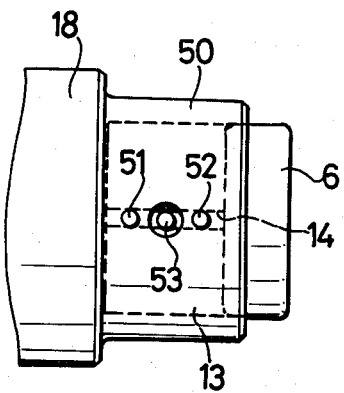
FIG. 6 is a plan view illustrating essential parts of the second embodiment shown in FIG. 5.

FIGS. 5 and 6 show a second embodiment of the invention in which in contradistinction to the first embodiment, the end face of the side valve member 18 is formed with a cylindrical extension 50 which projects therefrom in coaxial relationship, with a pair of projections 51, 52 radially extending from the internal surface of the extension 50. A projection 53 is formed on the input shaft 1 at a location intermediate the pair of projections 51, 52, and all of these projections 51, 52 and 53 are held by the C-shaped spring 13 inside the extension 50. Such construction is applicable where the projections 9, 10 and 12 cannot be located on the side of the control valve which is remote from the input shaft 1 as in the first embodiment.

It is to be noted that the free end 1a of the input shaft 1 is shaped to be substantially triangular in cross section so as to be fitted inside the inner valve member 16 while the outer valve member 17 and the first and the second side member 18, 19 are integrally connected together by pins 20 and are secured to the output shaft 2. The resulting control valve operates essentially in the same manner as the control valve of the first embodiment.

While the invention has been shown and described above in connection with several embodiments thereof, it should be understood that a variety of changes, modifications and variations will readily occur to those skilled in the art without departing from the spirit and the scope of the invention.

What is claimed is:

1. A power steering apparatus having an input portion and an output portion and comprising: an input shaft at said input portion and associated with a steering wheel, an output shaft at said output portion and disposed in axial alignment with the input shaft and associated with steerable road wheels, and a control valve comprising control valve elements mounted on the input and the output shaft, respectively, the control valve controlling the delivery to or displacement from a power cylinder of a hydraulic fluid in accordance with a relative angular displacement between the control valve elements, a pair of mating parts formed at the input portion and the output portion, respectively, for integral rotation therewith, and a spring having a substantially C-shaped configuration engageable at its circumferential ends with the mating parts, the resilience of the spring maintaining the mating parts in position, in which the C-shaped spring is varied in cross-sectional configuration between its said ends so that stresses produced therein are substantially uniform throughout the spring, said control valve being of disc type comprising a plurality of disk like control valve elements axially aligned with each other and with said C-shaped spring.

2. A power steering apparatus according to claim 1, wherein the mating parts are formed at locations which are axially offset from the axially aligned control valve elements.

3. A power steering apparatus according to claim 2 in which the spring and the mating parts are located on the side of the output shaft with respect to the control valve of disc type.

4. A power steering apparatus according to claim 1 in which a first said control valve element of the control valve comprises an inner disk like valve member rotatable with one of said shafts while second said disk like control valve elements of the control valve comprise a pair of side valve members which are located on the axially opposite sides of the inner valve member, said control valve further having an annular outer valve member surrounding the inner valve member and disposed axially between the side valve members, said outer valve member and side valve members being rotatable with the other said shaft.

5. A power steering apparatus having an input portion and an output portion and comprising: an input shaft at said input portion and associated with a steering wheel; an output shaft at said output portion and disposed in axial alignment with the input shaft and associated with steerable road wheels; a control valve of disc type formed by a pair of disk like control valve elements mounted on the input and the output shaft, respectively; the control valve controlling the delivery to or displacement from a power cylinder of hydraulic fluid in accordance with a relative angular displacement between the control valve elements; a pair of mating parts formed on the input portion and the output portion, respectively, for integral rotation therewith; with a spring having a substantially C-configuration engageable with the mating parts, the resilience of the spring maintaining the mating parts in position, the mating parts being at locations which are remote from the control valve elements, in which the spring and the mating parts are located on the side of the input shaft with respect to the control valve of disc type.

6. A power steering apparatus having an input portion and an output portion and comprising:
an input shaft at said input portion and associated with a steering wheel;
an output shaft at said output portion and disposed in axial alignment with the input shaft and associated with steerable road wheels;
first, second and third rotatable annular valve discs fixed to the output shaft for rotation therewith and telescoped over the input shaft for rotation with respect thereto, said second rotatable annular valve disc being axially sandwiched between said first and third annular valve discs;
an annular sleeve fixedly axially extending from one of said first and third rotatable annular valve discs and telescoped over said input shaft;
a C-shaped spring axially closely beside said one rotatable annular valve disc;
pins extending fixedly and radially from said annular sleeve and input shaft into a circumferential gap in said C-shaped spring, one of said pins being axially closely beside said one rotatable annular valve disc; and
a fourth annular valve disc fixed to said input shaft for rotation therewith and surrounded by said second rotatable annular valve disc, said fourth annular valve disc being axially sandwiched between said first and third rotatable annular valve disc, said fourth annular valve disc being on the opposite axial end of said one annular valve disc from said C-shaped spring and pins.

7. A power steering apparatus according to claim 6 in which said C-shaped spring surrounds said annular sleeve which in turn surrounds said input shaft adjacent the end of the latter, said output shaft terminating in said annular sleeve and thereby directly engaging said one rotatable annular valve disc, and C-shaped spring being axially next to the radially outer part of said one rotatable annular valve disc.

8. A power steering apparatus according to claim 6 in which said annular sleeve surrounds said C-shaped spring which in turn surrounds said input shaft, a pair of said pins radially extending inward from said annular sleeve toward said C-shaped spring and axially flanking a further said pin extending radially outward from said input shaft, said C-shaped spring being axially next to the radially inner part of said one annular valve disc.

9. A power steering apparatus according to claim 6 in which said fourth valve disc is substantially star-shaped due to provision in the periphery thereof of circumferentially spaced radially outwardly opening grooves, said first rotatable annular valve disc having a plurality of circumferentially spaced recesses in the side thereof adjacent said fourth annular valve disc for communicating with said grooves in the latter, said recesses being closed at their radially inner ends, alternating ones of said recesses being open at their radially outer ends to communicate with an annular groove in the outer periphery of said first rotatable annular valve disc, said second rotatable annular valve disc having passages opening radially therethrough and communicating between the outer periphery thereof and said grooves of said fourth annular valve disc, said third annular valve disc having a plurality of recesses in the side thereof facing said second and fourth annular valve discs and located for communicating with said grooves in said star-shaped fourth annular valve disc, said third annular valve disc including passages communicating between said side thereof and an annular groove in the outer periphery thereof, said apparatus including a housing surrounding said first, second and third rotatable annular valve discs and having ports communicating with grooves and passages in the outer periphery of said first, second and third rotatable annular valve discs.

* * * * *

UNITED STATES PATENT AND TRADEMARK OFFICE
CERTIFICATE OF CORRECTION

PATENT NO. : 4 488 475
DATED : December 18, 1984
INVENTOR(S) : Naosuke Masuda, Yoshio Suzuki and Tadaaki Fujii It is certified that error appears in the above-identified patent and that said Letters Patent is hereby corrected as shown below:

Column 6, line 16; change "with" to ---and---.

Signed and Sealed this

Second Day of July 1985

[SEAL]

Attest:

DONALD J. QUIGG

Attesting Officer

Acting Commissioner of Patents and Trademarks